United States Patent Office 3,712,831
Patented Jan. 23, 1973

3,712,831
CELLULOSIC FILMS WITH IMPROVED SLIP PROPERTIES
Jean Gattus, Villeurbanne, and Maurice Mallet, Lyon, France, assignors to Rhone-Poulenc S.A., Paris, France
No Drawing. Filed Sept. 29, 1969, Ser. No. 862,005
Claims priority, application France, Oct. 1, 1968, 168,322
Int. Cl. B44d 5/08
U.S. Cl. 117—144                    4 Claims

ABSTRACT OF THE DISCLOSURE

Cellulosic films, especially of cellulose acetate, have their slip properties improved by incorporation, at least in the surface of the film, of 0.1–0.5% by weight of a mineral filler, e.g. silica or a metal oxide, which has been treated with an organopolysiloxane.

---

The present invention relates to new cellulosic films, more particularly of cellulose acetate, of improved slip properties.

It is known that cellulosic films such as are obtained after drying a solution of a film-forming cellulose derivative cast in the form of a thin film on an appropriate surface (e.g. glass plate or metal strip) have a smooth but non-slippery surface. Thus when two films are placed in contact against one another (as usually happens because the films are generally stored in rolls or stacks without interleaving), the air which is present between those films is expelled, causing intimate contact between the films, which then tend to stick together. This adhesion is obviously a nuisance when it is subsequently necessary to separate the films in order to use them.

Various means for improving the slip of films, especially cellulosic films, have already been proposed. Thus in the case of regenerated cellulose films it has been proposed to impart a slight relief to the films by incorporating into the viscose from which they are made, before coagulation, a very small amount of a solid organic polymer in the form of a fine-grained powder (e.g. an aminoplast, phenoplast, polystyrene, vinyl polymer, polyester, or silicone (see French Pat. No. 1,458,612).

It has also been proposed (see French Pat. No. 1,385,905) to apply to non-fibrous sheets based on an organic material, finely divided particles, each comprising a mixture of amorphous silica and an alkali metal silicate.

New cellulosic films, more particularly of cellulose acetate, have now been found, which possess improved slip properties and comprise a film-forming cellulose derivative and, at least at the surface of the said film, a finely divided mineral filler treated with an organopolysiloxane vapour.

In accordance with the invention, these films may be obtained either (a) by incorporating the said filler into a solution of the cellulose derivative and then shaping and drying the film; or (b) by coating a preformed film of the cellulose derivative with a dispersion of the filler.

Suitable mineral fillers include fume silica (silica of combustion) precipitated silica, silicates, and metal oxides. These fillers should be used in the form of particles less than 10 microns, and preferably less than 0.1 micron, in size.

The organopolysiloxane used for the treatment of the filler can be any organopolysiloxane which can be vaporised. Preferably compounds having a boiling point at normal pressure below 450° C. are used. For example, linear alkylpolysiloxanes of which the chain ends are blocked by trialkylsilyl groups, such as decamethyltetrasiloxane, or cyclic alkylpolysiloxanes such as octamethylcyclotetrasiloxane, or alkylalkenylpolysiloxanes such as tetramethyltetravinylcyclotetrasiloxane can be used.

The mineral filler can be treated with the organopolysiloxane in the gaseous state by any known means, for example by the process described in U.S. Pat. No. 3,085,905.

As has been stated, the treated filler can be combined as a dispersion with the cellulose derivative. The ingredients of the dispersion (cellulose derivative, plasticizer if any, treated filler, solvent for the cellulose derivative, and any additional solvent used to disperse the filler) must, of course, be inert to each other and (except in the case of the filler) miscible with the solvent. Preferably, any solvent used to disperse the filler is the same as the solvent for the film-forming cellulose derivative.

A very small amount of treated filler (e.g. 0.1%, based on the weight of the cellulose derivative) allows excellent results to be obtained. It is in fact preferable to use as small an amount of filler as will produce the desired effect, especially when it is desired not substantially to change the transparency of the films obtained. A content of 0.5% filler can generally be considered as a practical maximum.

The treated filler may be incorporated into the solution of the cellulose derivative at ordinary temperature and with stirring so as to ensure a uniform distribution of the filler in the solution. The manufacture of films from the latter can then take place in accordance with the usual processes.

In the alternative procedure where a pre-formed film is coated with a dispersion of the treated filler, the process can be carried out by any usual method, for example by a lip-type casting device. The thickness of the coating layer can be very low (e.g a few microns).

The films of the invention show remarkable slip properties. They no longer adhere to one another even when they are strongly pressed together. Equally it is found that the adhesion of the films to metal is significantly reduced. These excellent properties represent considerable advantages and in particular greatly facilitate the handling of the films. Also films having good slip properties can be obtained with a very much smaller amount of the filler than that which would have been necessary if untreated filler had been used.

The example which follows illustrate the invention.

EXAMPLE 74 g. of cellulose acetate having an acetyl content of 55% by weight calculated as combined acetic acid, 8 g. of triphenylphosphate, 16 g. of ethyl phthalate and 330 g. of a 90/10 mixture of methylene dichloride and methanol, are stirred together in a mixer, and a filler consisting of fume silica of high specific surface, treated with octamethylcyclotetrasiloxane, as described in U.S. Pat. No. 3,085,905, is added in a weight of 0.1% based on the weight of the acetate, i.e. 0.074 g.

The solution obtained is filtered, freed of bubbles and cast on a conventional machine for the continuous manufacture of films. The solution is dried at 40° C. and the resulting film is detached from the support and then passed into a dryer at 70° C. to remove the last traces of solvent. The film obtained has a thickness of 0.19 mm.

By way of comparison, two other solutions are prepared from the same constituents (cellulose acetate, plasticizer and solvent) except that, in one case, untreated fume silica of high specific surface is incorporated in an amount of 0.1% based on the weight of the cellulose acetate and, in the other, no filler is incorporated into the solution. The two solutions are then converted into films under the conditions described above. The thickness of the films is again 0.19 mm.

The ability of these films to slip over one another is determined in accordance with Standard Specification ASTM D 1894 63 T. The tests consist of sliding over one another two films in contact over a given face and subjected to a load of 500 g., at a relative speed of 140 mm./minute, and measuring the tensile force which the driven film transmits to the fixed film. The coefficient of friction (C.F.) is obtained by the formula:

$$C.F. = \frac{\text{Frictional force } (g)}{\text{Load } (g)}$$

The table which follows gives the value of the coefficient of friction for each of the films used:

(a) In the case where the films are applied to one another air face/air face; and (b) in the case where the films are applied to one another air face/belt face. The "air face" is the face of the film in contact with air during shaping, and the "belt face" is the face in contact with the casting support. Where possible, the minimum and maximum values obtained with 6 films are indicated, as well as the average value.

|  | Coefficient of friction ||||||
| --- | --- | --- | --- | --- | --- | --- |
|  | Air face/air face ||| Air face/belt face |||
|  | Minimum | Average | Maximum | Minimum | Average | Maximum |
| Film according to the invention | 0.59 | 0.60 | 0.62 | 0.63 | 0.64 | 0.65 |
| Film obtained using untreated filler | 1.3 | 1.7 | 1.9 | 0.8 | 1.0 | 1.2 |
| Film containing no filler | Greater than 2 ||| Greater than 2 |||

This table shows:

(1) That the films of the invention have a markedly lower coefficient of friction than that of films containing untreated filler and, a fortiori, than that of unfilled films.

(2) That the differences (minimum-maximum) in the coefficients of friction are much less with the films according to the invention than with the films with untreated fillers. It is obviously advantageous to have available films of which the coefficient of friction is essentially constant, at all points of the film and from one batch to the next.

We claim:

1. A celulosic film having improved slip properties comprising a film-forming cellulose derivative and 0.1–0.5% by weight of a finely-divided, organopolysiloxane vapour-treated mineral filler, the filler being present at least in the surface of the film and having a particle size less than 10 microns.

2. A film according to claim 1, in which the cellulose derivative is cellulose acetate.

3. A film according to claim 1, in which the filler is fume silica.

4. A film according to claim 3, in which the fume silica is treated with octamethylcyclotetrasiloxane.

References Cited

UNITED STATES PATENTS

| 2,084,313 | 6/1937 | Beach | 18—57 |
| 2,431,873 | 12/1947 | Kennelly | 117—144 X |
| 2,658,843 | 11/1953 | Brillhart | 117—144 |
| 2,999,774 | 9/1961 | Schappel | 117—144 X |
| 2,983,625 | 5/1961 | Schappel | 117—145 X |
| 2,985,546 | 5/1961 | Leavitt | 117—145 X |
| 3,077,460 | 2/1963 | Fortess et al. | 117—145 X |
| 3,085,905 | 4/1963 | Prevot et al. | 117—123 X |
| 3,258,441 | 6/1966 | McEwan et al. | 117—145 X |
| 3,409,460 | 11/1968 | Mitchell et al. | 117—145 X |

WILLIAM D. MARTIN, Primary Examiner

M. R. LUSIGNAN, Assistant Examiner

U.S. Cl. X.R.

106—193 J, 196